United States Patent [19]

Barr, Jr. et al.

[11] 3,866,161

[45] Feb. 11, 1975

[54] METHOD AND APPARATUS FOR OBTAINING A MORE ACCURATE MEASURE OF INPUT SEISMIC ENERGY

[75] Inventors: Frederick J. Barr, Jr.; W. Harry Mayne; Clifford H. Ray, all of San Antonio, Tex.

[73] Assignee: Petty-Ray Geophysical, Inc., Houston, Tex.

[22] Filed: Jan. 24, 1973

[21] Appl. No.: 326,178

[52] U.S. Cl.... 340/15.5 CP, 340/7 R, 340/15.5 MC
[51] Int. Cl............................................. G01v 1/16
[58] Field of Search........ 340/7 R, 15.5 CP, 15.5 A, 340/3 T, 15.5 F, 2, 15.5 MC, 15.5 TA

[56] References Cited
UNITED STATES PATENTS

| | | | |
|---|---|---|---|
| 2,465,696 | 3/1949 | Paslay | 340/2 |
| 2,757,356 | 7/1956 | Haggerty | 340/7 R |
| 3,209,855 | 5/1965 | Prickett, Jr. et al. | 340/15.5 TA |
| 3,274,542 | 9/1966 | Ruehle | 340/15.5 F |
| 3,278,893 | 10/1966 | Silverman | 340/7 R |
| 3,350,683 | 10/1967 | Sengbush | 340/7 R |
| 3,371,310 | 2/1968 | Silverman | 340/15.5 MC |
| 3,523,277 | 8/1970 | Landrum, Jr. | 340/15.5 TA |

FOREIGN PATENTS OR APPLICATIONS

| | | | |
|---|---|---|---|
| 1,193,507 | 6/1970 | Great Britain | 340/7 R |

*Primary Examiner*—Maynard R. Wilbur
*Assistant Examiner*—H. A. Birmiel
*Attorney, Agent, or Firm*—Arnold, White & Durkee

[57] ABSTRACT

In a number of methods of seismic data analysis an accurate measure of the effective downward-going seismic waveform is required. For example, the effective downward-going seismic waveform is required in certain pulse resolution and deconvolution techniques. The effective downward-going seismic waveform is made up primarily of a composite of the waveform initially downward-going from the seismic source as well as the wave initially upward-going that is reflected from the air-earth or air-water interface. The method described herein is based upon the discovery that there is a "near field effect" which prevents the monitoring by a detector located in the immediate vicinity of the seismic source from being an accurate measure of the composite seismic waveform. Methods are described for converting waveform measurements made in the immediate vicinity of the seismic source to those effective at greater depths as well as for compensating for a similar effect at the reception of the seismic wave by seismic detectors located beneath or at the air-water or air-earth interface.

10 Claims, 5 Drawing Figures

METHOD AND APPARATUS FOR OBTAINING A MORE ACCURATE MEASURE OF INPUT SEISMIC ENERGY

BACKGROUND OF THE INVENTION

This invention relates to seismic exploration, and more particularly to an improved method and apparatus for obtaining a more accurate measure of the effective downwardgoing seismic waveform.

In our co-pending application, Ser. No. 212,533, now abandoned, filed Dec. 27, 1971, there is described a method of seismic exploration in which a seismic record is processed to produce a record that would have been produced with a desired input seismic wave. In a preferred mode of operation, the actual input seismic waveform used in obtaining the seismic record in the field is recorded in a recording channel with the same phase, amplitude and recording characteristics as are the seismic data. The recording of the input seismic wave has been used to derive a set of corrections for the frequency components of the input seismic waveform that would, is applied, produce a desired input seismic waveform; for example, zero phase. A set of corrections may be derived from either the phase response of the input seismic waveform or from both its phase and amplitude response. The derived corrections are then applied directly to the seismic record to produce a resulting record with the characteristics of a record that would be obtained by the actual use of the desired input waveform. The resolution of discrete events such as reflections on the resulting record is significantly improved. The complexity of any input seismic wave can be reduced to a desired form such as compression of a complex and undulatory signal into a single, well-defined, impulsive event.

The method described in our above-reference copending application requires an accurate measure of the effective downward-going seismic waveform. Other presently existing methods of processing seismic data also involving some kind of pulse compression require accurate knowledge of the waveform of the seismic event.

It is always helpful in producing and processing seismic records to have knowledge of the waveform of the composite seismic wave that is propagated into the earth. It is well known to record a signal from a detector or pressure transducer located in the vicinity of the source of seismic waves. For example, in U.S. Pat. No. 2,281,949 to Ritzmann, the output from a detector located in the vicinity of the seismic source is used to control the gain of the amplifiers used for recording the reflected waves in a reflection spread. U.S. Pat. No. 2,557,714 to Williams describes the technique of recording the shape of the initial disturbance so that the identification of reflections may be made more easily by a visual comparison of the shape of the initial disturbance with the shape of the waveforms on the resulting records.

In U.S. Pat. No. 2,882,988 to Dobrin, there is described a method employing the recording of a shot pulse signature to remove the effect of the secondary pulse generated by waves reflected above the source at the base of the weathered layer or the air-earth interface. A sub-shot detector is located in the earth in the vicinity of the source of seismic waves to detect, not only the initially downward traveling waves of the source, but also the waves reflected from boundaries above the source, such as the bottom of the weathered layer. Reproducible seismic records are obtained from the detectors in a reflection spread in the usual manner and are then processed to remove the effect of the secondary wave. The output of the sub-shot detector is used to determine time shifts in relative primary-to-secondary pulse amplitude in processing the record.

U.S. Pat. No. 3,592,286 to Johnson discloses an attempt to deal with the problem of the secondary pulsations created by an expanding gas bubble in marine operations. A detector is used in the field to record the waveform of the seismic energy created by the expanding gas bubble. This waveform is then used as the basis of deriving a processing operator which could be applied to the reflected seismic data to remove the effect of the secondary pulsation.

All of the prior art relating to obtaining an estimate or measure of the effective seismic waveform have employed pressure transducers located in the immediate vicinity of the source of seismic energy. We have discovered that there is a "near field effect" associated with obtaining measurements of the waveforms in the immediate vicinity of the seismic energy source, and that more accurate representations of the composite downward going seismic waves can be derived or obtained in accordance with the present invention.

SUMMARY

We have found a way to avoid the "near field effect" and obtain a more accurate measure of the waveform of the downward going seismic wave.

According to one embodiment of our invention, the waveform transmitted for each recording is monitored by an auxiliary detector located in the immediate vicinity of the source of seismic energy. For this embodiment, it is necessary to known the correct velocity of sound in water, the geometric relationship of the source, the auxiliary detector, the airwater interface and the depth of the seismic detector cable. The signals from the auxiliary detector are preferably passed through the same recording and amplifying system as are the signals from the seismic detector cables so that they will have the same phase and amplitude characteristics. These parameters are used to produce filter operators that will convert the waveform recorded from the auxiliary detector in the immediate vicinity of the seismic source to correct for the "near field effect" and produce a representation of the waveform that would be down traveling at a deep reflecting horizon.

According to another embodiment of the invention, an auxiliary detector is located at great depth on the order of 1,000 feet below the surface of the water and beneath the source of seismic energy. The ordinary seismic survey is not conducted at the time of making monitor tests according to this embodiment. The auxiliary detector may be suspended on a long cable beneath a buoy or float on the surface. That buoy or float may be connected by a radio or hard wire link to receiving equipment on board a boat which carries the seismic energy source. A test recording may be made by energizing the seismic energy source to propagate a wave and recording the waves received at the deep auxiliary detector, together with a record of the depth of that auxiliary detector, the depth of the source of seismic energy, the instantaneous sound velocity in the water at the time, and the amount of energy (or number of seismic energy sources) in the seismic energy source.

The procedure may be repeated for a number of successive transmissions of seismic energy. Thus, a library can be built up of recordings of waveforms from this auxiliary detector located at great depth according to different parameters for the conditions that will be actually met in running a seismic survey. These parameters can then be matched with the actual parameters used in running a seismic survey to select the waveform recording that would have been produced had an actual monitoring been made simultaneously.

BRIEF DESCRIPTION OF THE DRAWINGS

The accompanying drawings are briefly described as follows.

DESCRIPTION OF SPECIFIC EMBODIMENTS

Figure 1:
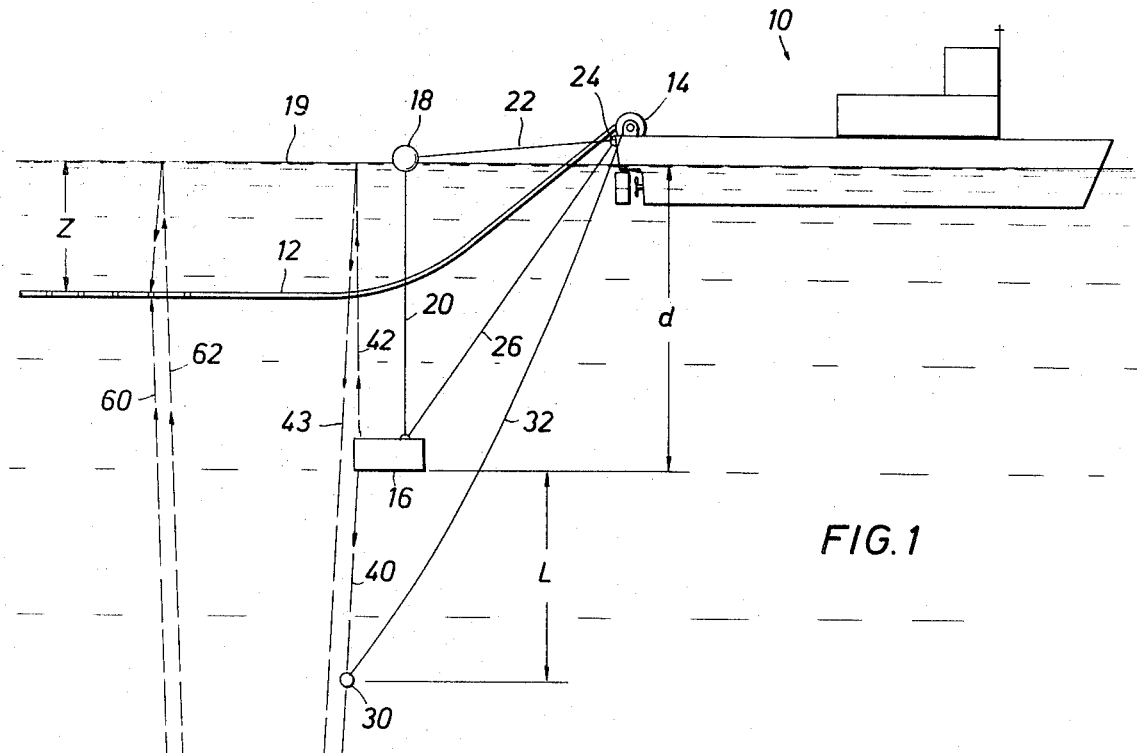
FIG. 1 is a diagram of a marine seismic surveying procedure employing the present invention.

In the accompanying drawings, like parts in the various figures will be given like reference numerals and will not be described in connection with each and every figure.

It will be appreciated that the present invention can take many forms and embodiments, all of which would be impossible to describe or illustrate here. A limited number of forms of the invention and equipment embodying the invention will be described and illustrated for the purpose of giving an understanding of the invention. The true essence and spirit of the invention is defined in the appended claims, and it is not intended that the limited embodiments described in this specification and shown in the drawings should limit the invention.

Since the invention is particularly applicable to marine seismic exploration, it will be described primarily with reference to that field. It should be understood, however, that the invention is also applicable to land exploration. As used herein, the term "surface" is intended to mean either the air-water interface in marine exploration or the air-soil interface in land exploration.

In FIG. 1 is shown a seismic survey boat 10 which is indicated schematically without showing the usual recording equipment located on board. A seismic detector cable 12 is towed behind the boat 10 and is dispensed from a reel or drum 14. The seismic detectors (hydrophones) are indicated schematically by bold lines inside the cable 12. As is conventional practice, the seismic detector cable 12 may include a number of arrays of individual seismic detectors which are connected in common with a recording channel and which are spaced along the length of the seismic cable 12. The seismic cable 12 serves as the mechanical means for towing the hydrophones which it carries as well as conveying the wires containing the electrical signals produced and connecting them to the recording equipment aboard the boat 10.

A source of seismic energy 16 is shown in the water suspended by a harness from the boat 10. The harness includes a flotation device 18 floating on the water's surface 19, from which the source 16 is suspended by a rope or cable 20. The flotation device 18 is connected by a rope or cable 22 to a tie-point 24 affixed to the boat 10. Also, the seismic source 16 is connected by a rope or cable 26 to the tie-point 24 on the boat 10.

Seismic source 16 may, for purposes of this invention, be of any type, including dynamite, but most surveys at this time are now being conducted with a pneumatic source which is filled with high pressure air under pressure that is suddenly released into the water surrounding the source. The air supply line from the seismic energy source 16 is unshown in FIG. 1 for clarity, but in actual practice an air hose is supplied from a compressor source aboard the boat 10 to the internal chambers of the seismic source 16. The air supply within the internal chambers of the source 16 is suddenly released upon command by equipment aboard the boat 10.

An auxiliary detector 30 is located in the water just below the seismic energy source 16 and is suspended by a cable 32 leading aboard the boat 10. The cable 32 provides the mechanical support for towing the detector 30 as well as conveying the conductors for the electrical signals which are connected to the recording equipment aboard the boat 10. The auxiliary detector 30 receives a sample of the effective downward going wave and produces electrical signals which are carried through the cable 32 to be recorded on the recorder aboard the boat 10.

When the seismic source 16 releases seismic energy, there is created an initially downward-going wave which is shown diagrammatically by raypath 40 as well as an initially upward-going seismic wave which is shown by raypath 42 that is reflected at the air-water interface 19 and sent downwardly again as shown by raypath 43. Because the air-water interface 19 is a highly efficient reflector with a reflection coefficient of virtually negative unity, most of the seismic energy that is initially upward-going is reflected downwardly with opposite polarity to the initially downward-going waveform and at slightly delayed time. The auxiliary detector receives the composite of the initially downward-going and the initially upward-going components, but with a "near field effect" which will be described in more detail in the following description. Nevertheless, for each propagation of seismic energy by the source 16 during the course of a seismic survey a recording is made of the waves received at the auxiliary detector 30, together with a recording of the depth of the seismic energy source 16, d, the distance L between the seismic energy source 16 and the auxiliary detector 30 and the velocity of sound in water v.

Figure 2:
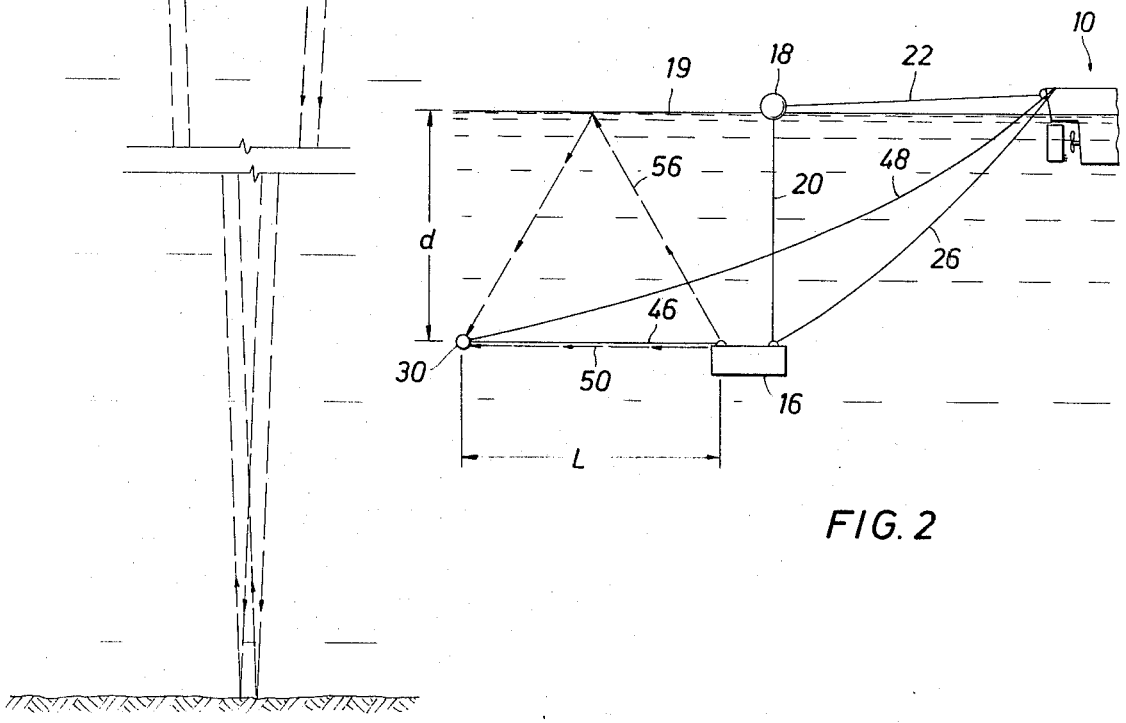
FIG. 2 is a diagram of an alternative method of locating and connecting the auxiliary detector.

FIG. 2 is a diagram of an alternate embodiment for the location of the auxiliary detector 30. In the embodiment of FIG. 1, the requirement of knowledge of the exact depth of the auxiliary detector 30 requires the use of a depth transducer located within the detector 30 so that its depth can be continuously monitored. In FIG. 2 this depth transducer may be eliminated by towing the auxiliary detector 30 by a wire, cable or rope 46 behind the seismic source 16 while the boat 10 is under speed. The auxiliary detector 30 will be maintained at substantially the same depth as is the seismic energy source 16. An additional cable 48 may be used as an electrical connection between the auxiliary detector 30 and the recording equipment aboard the boat 10.

For the explanation that follows, let
$d$ = the depth of the seismic energy source 16 and the auxiliary detector 30, in feet;
$L$ = distance from the seismic energy source 16 to the auxiliary detector, in feet;
$v$ = velocity of sound and water, in feet per second;
$a(t)$ = waveform emitted by the seismic energy source 16;
$r(t)$ = waveform received by the auxiliary detector 30;
$s(t)$ = waveform reflected by a deep reflecting horizon;
$f(t)$ = waveform received by the seismic detector cable 12.

Referring now to FIG. 2, the first seismic energy to arrive at the auxiliary detector 30 is the direct arrival along raypath 50 which expressed in terms of $a(t)$ is $$1/L\, a(t-L/V) \quad (1)$$

where $t = o$ corresponds to the instant at which the energy source is activated. Energy is also reflected from the airwater interface (changing polarity there due to its negativeunity reflection coefficient) and arrives via raypath 56 to the auxiliary detector 30. The sum of the direct arrival and this indirect arrival may be expressed as $$r(t) = \frac{1}{L} a\left(t - \frac{L}{V}\right) - \frac{1}{\sqrt{4d^2 + L^2}} a\left(t - \frac{\sqrt{4d^2 + L^2}}{v}\right) \quad (2)$$

Choosing the following reasonable values for the parameters in equation (2):
$d = 20$ feet;
$L = 10$ feet;
$v = 5000$ feet per second,
substitution yields $$r(t) = .1\, a(t-.002) - .0243 a(t-.00825) \quad (3)$$

Note in equation (3) that the indirect arrival's amplitude is only 0.243 times that of the direct arrival and that the indirect arrival is delayed 0.00625 seconds after the direct arrival.

Now consider the case for the waveform $s(t)$ which is received by a very deep reflecting horizon located at a depth of 10,000 feet. By noting that the direct arrival travels 9980 feet, the indirect arrival travels 10,020 feet, and assuming that the medium of transmission is entirely of water, we can write:

$$s(t) = 1/9980\, a(t-1.996) - (1/10020)\, a(t-2.004) \quad (4)$$

Note that the indirect arrival's amplitude is 0.9978 times that of the direct arrival and that the indirect arrival is delayed 0.008 seconds after the direct arrival. Upon comparison of equations (3) and (4), it can be seen that the waveform of $r(t)$ measured at the auxiliary detector 30 is vastly different from that of $s(t)$ which is reflected from a deep subsurface reflecting horizon. The difference is accounted for by what we call the "near field effect" by which the distance $L$ between the auxiliary detector 30 and the seismic energy source 16 is of the same order of magnitude as the depth of both the auxiliary detector 30 and the seismic energy source 16. The direct arrival travels a path (such as raypath 50) which is short compared to the path (raypath 56) along which the indirect arrival travels. The difference in relative amplitude between the direct and indirect arrival are thus much more greatly magnified at the distance $L$ than at the distance of the deep horizon. At the distance of the deep horizon, the very small additional travel path ($2d$) that the indirect arrival travels is substantially equal to the travel path of the direct arrival. The indirect arrival has therefore substantially the same amplitude as the direct arrival and a very small time delay.

From inspection of equation (4) it can be seen that the waveform appearing at a deep reflecting horizon $s(t)$ is a function of $a(t)$, the actual waveform emitted by the seismic energy source and not a function of the waveform detected by the auxiliary detector. It is, however, possible to obtain a representation of $s(t)$ from that of $r(t)$ if we known the relative geometry shown in FIG. 1 and the velocity of sound in water. We do this by designing a deghosting filter to obtain the waveform of $a(t)$ from that of $r(t)$. This deghosting filter can be of well-known design based upon the relative amplitudes of the direct and indirect arrivals and the differences in their arrival time. For a detailed explanation of the design and theory of deghosting filters, see an article by J. P. Lindsey, "Elimination of Seismic Ghost Reflections by Means of a Linear Filter," *Geophysics*) Vol. XXV, No. 1 (Feb. 1960), p. 130.

After $a(t)$ is obtained, $s(t)$ can be formed by knowledge of the depth $d$ in FIG. 1 and the velocity of sound in water and by assuming the indirect arrival to be equal in amplitude to that of the direct arrival.
Then $$s(t) = a(t) - a(t - 2d/v) \quad (5)$$

Equation (5) then expresses the relationship for determining the waveform at a deep reflecting horizon based upon the actual emitted waveform of the seismic source $a(t)$. It is this waveform $s(t)$ that should be used as a measure of the actual waveform transmitted deep within the earth and reflected to a detector located at the earth's surface.

If expressed in words, equation (5) says that an accurate representation of the seismic waveform at a deep reflecting horizon is produced by:

1. obtaining the waveform directly emitted by the seismic source; and
2. adding to that waveform a replication of the same waveform of reversed polarity and delayed in time by the seismic travel time between the seismic source and the earth's surface.

For the purpose of the formulation of equation (5) the function $a(t)$ may be obtained as above described from $r(t)$ (the waveform measured at an auxiliary detector) or by other means. One alternative means makes use of a computational algorithm such as described by "A method for calculating the output pressure waveform from an air gun," Anton ziolkowski, *Geophys. J.R. astr. Soc.*, Vol. 21, 1970, pp. 137-161, based upon knowledge of the chambers size of a pneumatic seismic source, the depth in the water and the instantaneous sound velocity in the water.

We have made the additional discovery that when the seismic detector is located beneath an air-water interface (in marine operations) or beneath the weathered layer or air-earth interface (in land operations), there is a similar ghosting effect that should be eliminated. This ghosting effect will be referred to in this discussion as the "cable effect." Referring in particular to FIG. 1 there is a direct arrival shown by raypath 60 that strikes the seismic cable 12 as well as an indirect arrival shown by raypath 62 that travels past the seismic cable 12, is reflected at the air-water interface 19 and strikes the seismic cable 12. The indirect arrival is thus reduced in amplitude by the spherical divergence through the water distance 2z and is of reverse polarity and delayed in time by twice the travel time over the distance z. Thus, the direct arrival along raypath 60 is represented by $s(t)$ according to equation (5) above, but the actual waveform appearing at the seismic cable constitutes the direct and the indirect arrival which, if the direct and indirect arrivals are assumed to be of the same amplitude, can be represented as follows:

$$f(t) = s(t) - s(t - 2z/v) \quad (6)$$

where $z$ = depth of seismic streamer cable, in feet. Substituting equation (5) into equation (6) yields $$f(t) = a(t) - a(t - 2d/v) - a(t - 2Z/v) + a(t - 2d + 2Z/v) \quad (7)$$

So, it is the waveform represented by equations (6) or (7) that must be used to obtain a measure of the actual input seismic waveform that is reflected by a deep reflecting horizon and is received at a seismic cable located beneath the surface of the earth.

If stated in words, equation (6) says that the waveform appearing at the seismic cable is produced by:

1. obtaining a representation of the waveform appearing at a deep reflecting horizon; and
2. adding to the representation of the waveform appearing at a deep reflecting horizon a replication of that waveform of opposite polarity and delayed in time by twice the travel time of sound between the seismic cable and the earth's surface.

The processing of the representation of $a(t)$, $s(t)$ or $r(t)$ to obtain the accurate representations according to the foregoing description can be carried out with any suitable processing equipment of either analog or digital type. Since such equipment and its operation are well known, it will not be described in detail herein.

A presently preferred embodiment of the invention is to monitor the waveform $r(t)$ at an auxiliary detector with the arrangement as shown in FIG. 2 for each generation of seismic energy during the course of the seismic survey. The auxiliary detector 30 preferably should have the same phase and amplitude characteristics as do the detectors used in the seismic cable 12. For example, the auxiliary detector 30 may comprise the same type and number of detectors used in a single array for one channel of the seismic cable 12. The cable 48 which conveys the electrical signals from the auxiliary detector 30 should also have the same transmission characteristics as does one channel of the seismic streamer cable. The cable 48 may actually be one of the channels within the seismic cable 12. The auxiliary detector 30 may be connected directly by a line unshown to a connector on the seismic cable 12. The channel may then be connected through one of the same recording channels used in the amplifying and recording equipment for the channels of the reflection seismic data. This arrangement assures that the sample waveform received by the auxiliary detector will be recorded with the same phase and amplitude characteristics as are the reflection seismic data.

In practicing the preferred embodiment of the invention, it is required that the depth of the seismic energy source 16, as well as the auxiliary detector 30 (depth $d$), be known. Several mechanisms may be employed to maintain this known depth, one of which is the simple suspension from a float system, as illustrated in FIG. 2. The auxiliary detector remains at substantially the same depth as the seismic energy source 16 for full speed operation. Another mechanism for obtaining knowledge of the depth is to allow the seismic energy source 16 to ride at any depth as towed by a single tow cable, but include a depth transducer thereon with suitable readout aboard the boat to maintain a record of the actual depth at any instant.

Another parameter that is required to be known for the preferred embodiment of the invention is the instantaneous sound velocity in the water. It is well known to include a velocimeter in seismic survey vessels which will provide the readout required for any instant. The depth $z$ of the seismic streamer cable as shown in FIG. 1 is readily provided by depth transducers that are located along the length of seismic cable 12 with an external readout aboard the vessel 10. Such depth transducers are provided in many of the commercially available seismic streamer cables such as those available from Vector Cable Company, Houston, Tex.

In alternate embodiments of the invention, the waveform at deep reflecting horizons $s(t)$ can be appropriately measured for marine operations by actually placing an auxiliary detector at great depths in the water. Such an embodiment can probably not be used for continuous profiling at the same time that seismic data are being recorded, but could be done before or after a marine survey operation with sufficiently varied parameters to present a set of conditions that could be matched with those actually used in the survey operation.

Figure 3:
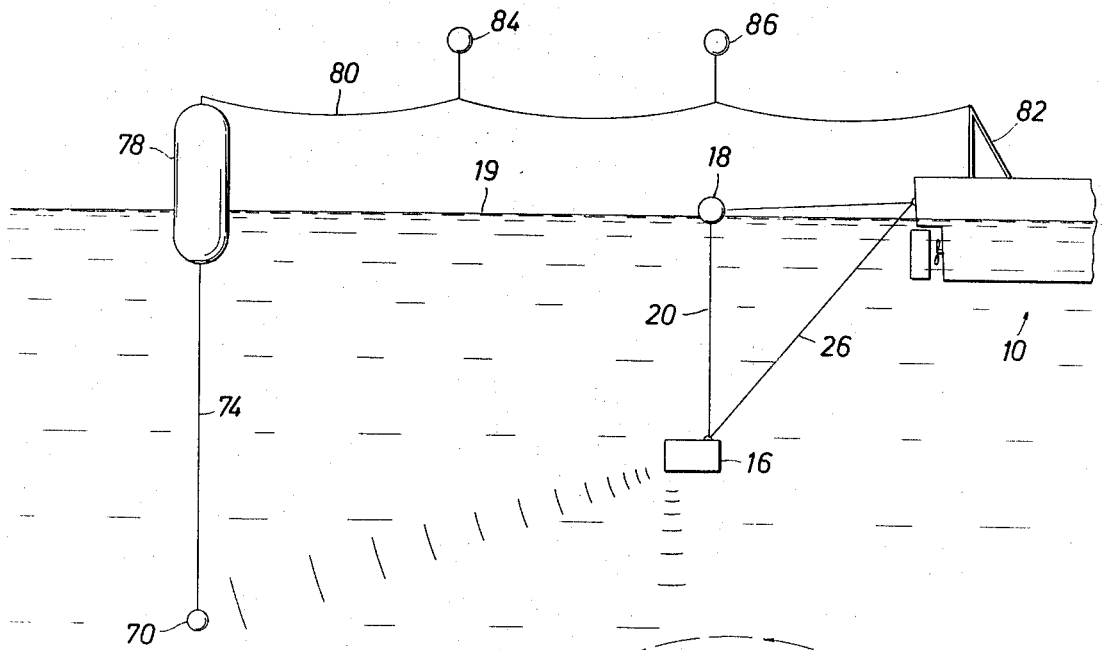
FIG. 3 is a diagram of the method of recording sample source waveforms according to one embodiment of the present invention.

FIG. 3 illustrates one such alternative embodiment. An auxiliary detector 70 is suspended by a line 74 beneath some sort of flotation device such as a buoy 78. The depth of the auxiliary detector 70 should be very great—on the order of 1,000 feet. A wire line 80 is extended from the buoy 78 to a fixture 82 secured to the boat 10. The wire line 80 may be raised and kept out of the water by any number of means such as a pair of helium-filled balloons 84 and 86 which are secured to the wire line 80. The auxiliary detector 70 is connected to recording equipment aboard the boat 10 through line 74 and the wire line 80. The water depth for the operation depicted in FIG. 3 should be appreciably greater than the depth of the auxiliary detector 70 so that a portion of the waveform transmitted by the seismic energy source 16 is not reflected from the water bottom and received simultaneously with a direct arrival of $s(t)$.

To begin operation depicted in FIG. 3, the seismic source 16 is fired and a recording is made of the waveform received at the auxiliary detector 70. This waveform has been filtered, amplified and recorded in the same manner as are signals from the seismic streamer during regular operations. Care should be taken that the phase and transmission characteristics of the auxiliary detector 70, the line 74, and the wire line 80, as well as the recording equipment match those used for detecting, transmitting and recording of the ordinary seismic data.

Figure 4:
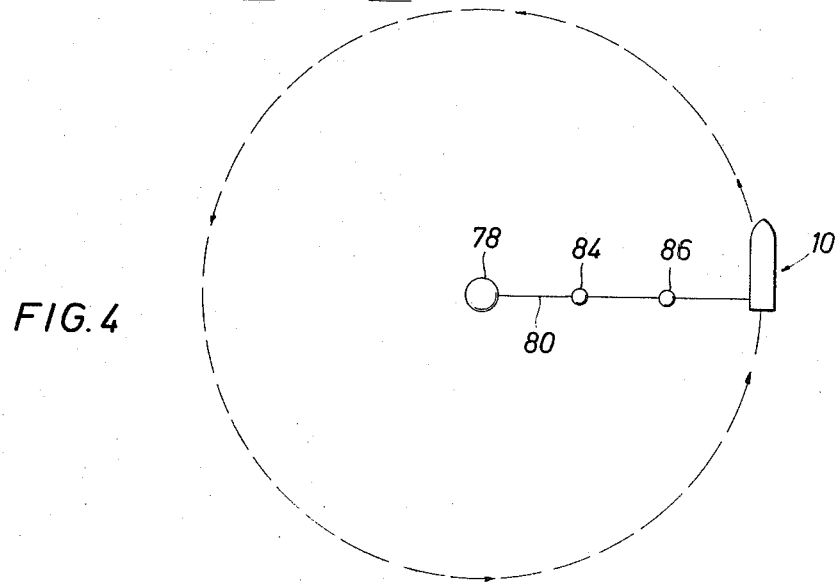
FIG. 4 is a top view of a diagram for the method illustrated in FIG. 3.

The foregoing procedure is repeated again and again while varying the number of energy sources, their depths and their air pressures. Thus a library of $s(t)$'s is generated and recorded. The boat 10 may remain substantially stationary during the foregoing procedure or may travel in a circle about the buoy 78 as is illustrated in FIG. 4. It is preferred that the library of $s(t)$'s also include records of the velocity of sound in the water if there is any appreciable variation in the area under survey.

Figure 5:
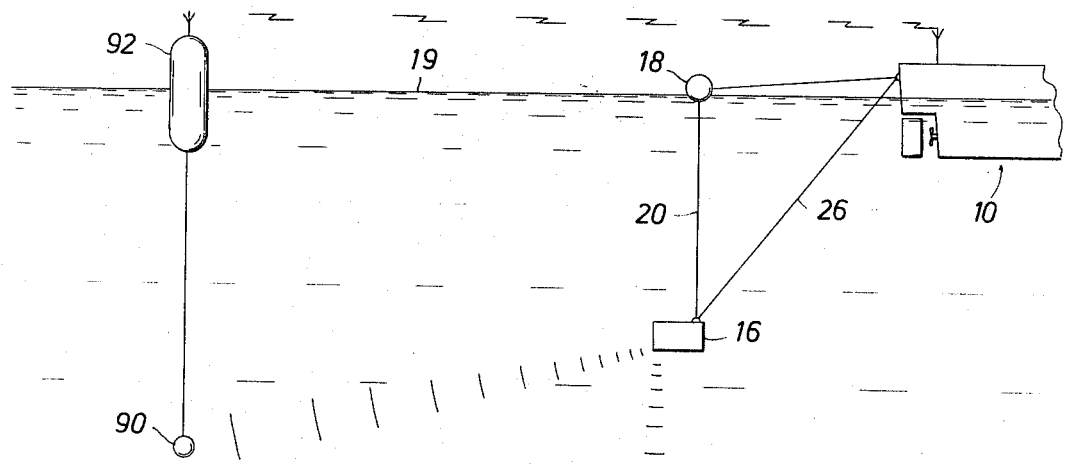
FIG. 5 is a diagram of an alternative method of obtaining the sample waveform according to the present invention by use of a radio buoy.

Another possible means of obtaining a sufficient representation of $s(t)$ is illustrated in FIG. 5. Before or after the seismic survey, an auxiliary detector 90 is suspended at great depth from a buoy 92 containing a high grade FM modulator and transmitter such as the Sonobuoy manufactured and sold by Oceanography International Corporation, College Station, Tex. The boat 10 passes near the buoy 92 and fires the seismic energy source 16. A receiver on board the boat 10 demodulates the FM signal received from the buoy 92. It is then filtered and recorded in the same manner as signals from the seismic streamer during regular operations. This procedure is repeated while varying the number of energy sources, their depths and their air pressures to build up a library of $s(t)$'s as described above in connection with FIG. 3. The critical point for the operation depicted in FIG. 5 is the difficulty in measuring the exact transmission characteristics and phase of the transmission system including the FM modulator and demodulator. These characteristics must be known accurately in order to compensate for them and make them equivalent to those used in recording the ordinary seismic data. Without a common base of reference for phase and amplitude characteristics there can be no meaningful comparison of results.

What is claimed to have been invented or discoveres is:

1. In seismic exploration in which seismic records are made of the waves received at seismic detectors after being emitted by a seismic source located beneath the surface and reflected from subsurface reflecing horizons, the method comprising:
   locating an auxiliary detector at a depth below the surface that is large compared to the depth of the seismic source below the surface;
   transmitting seismic waves from the seismic source;
   recording representations of the waves received at the auxiliary detector;
   adjusting each of the amount of seismic energy transmitted by the seismic source and the depth of the seismic source and repeating the foregoing steps, whereby a library of recordings is generated for different parameters; and,
   pairing the recordings thus made with seismic records made with substantially the same parameters.

2. In seismic exploration, a method of obtaining an accurate representation of the seismic waveform reflected from a deep reflecting horizon, comprising the steps of:
   obtaining a representation of the waveform directly emitted by a seismic source located below the surface; and adding to said waveform a replication of said waveform of reversed polarity delayed in time by the seismic travel time between the source and the surface, of a wave emitted by the source and reflected by the surface.

3. A method according to claim 2 wherein said step of obtaining a representation of the waveform emitted by the seismic source includes the steps of:
   locating an auxiliary detector in the immediate vicinity of said seismic energy source;
   recording a representation of the waveform received at said auxiliary detector and comprising a component of direct arrival from said seismic energy source and a component of an indirect arrival which is reflected from the surface;
   filtering said representation received at said auxiliary detector with a deghosting filter which removes the component of the indirect arrival.

4. A method according to claim 2 wherein said seismic detectors are located below the surface and compensation is made for the effect of reflections of seismic waves from a deep reflecting horizon that are reflected from the surface to the seismic detectors, said method comprising:
   adding to the waveform received at the deep reflecting horizon a replication of that waveform of opposite polarity and delayed in time by twice the travel time of sound between said seismic detectors and the surface.

5. In marine seismic exploration in which seismic records are made of the waves received at seismic detectors after being emitted by a seismic source located beneath the water surface and reflected from subsurface reflecting horizons, the method comprising:
   suspending an auxiliary detector by a cable from a float located on the water surface, the auxiliary detector being located at a depth in the water that is large compared to the depth of the seismic source below the surface;
   transmitting seismic waves from the seismic source;
   receiving resultant reflected waves at the auxiliary detector and producing related signals;
   relaying the signals produced at the auxiliary detector through the cable and via a transmission link extending from the float to a recording station aboard a boat located remotely from the float;
   recording such signals relayed to the recording station;
   adjusting successively the amount of seismic energy transmitted by the seismic source and the depth of the seismic source and repeating the foregoing steps, whereby a library of recordings is generated for different parameters; and,
   pairing the recordings thus made with seismic records made with substantially the same parameters.

6. A method according to claim 5 wherein the transmission link comprises a radio channel and the signals are relayed to the recording station via radio waves.

7. A method according to claim 5 wherein the transmission link comprises a wire line connected between the float and the boat.

8. Apparatus for marine seismic exploration for obtaining an accurate representation of the seismic waveform reflected from a deep reflecting horizon for use in processing reflection seismic records, such apparatus comprising:
   a boat;
   a seismic source suspended from the boat at a depth below the water surface, such source being capable of transmitting seismic waves for reflection from far subsurface horizons;
   a buoy located on the water surface remotely from the boat;
   an auxiliary detector suspended by a cable from the float at a depth that is large compared to the depth of the seismic source below the water's surface, such auxiliary detector being capable of detecting seismic waves reflected from subsurface horizons and producing related signals;
   a signal transmission link extending from the buoy to the boat, for relaying the signals produced by the auxiliary detector; and
   a recorder aboard the boat and connected to the signal transmission link for recording representations of the signals produced by the auxiliary detector.

9. Apparatus according to claim 8 wherein the signal transmission link comprises a wire line extending from the buoy to the boat.

10. Apparatus according to claim 8 wherein the signal transmission link comprises:
   a radio transmitter located on the buoy; and
   a radio receiver located on the boat.

* * * * *